United States Patent [15] 3,674,803
Scherer et al. [45] July 4, 1972

[54] 2-0,0-DITHIOPHOSPHORYL-METHYL-BENZOXAZOLE

[72] Inventors: Otto Scherer, Bad Soden/Taunus; Gerhard Stahler, Frankfurt/Main, both of Germany

[73] Assignee: Farbwerke Hoechst Aktiengesellschaft vormals Meister Lucius & Bruning, Frankfurt/Main, Germany

[22] Filed: July 16, 1969

[21] Appl. No.: 842,404

Related U.S. Application Data

[63] Continuation-in-part of Ser. No. 552,408, May 24, 1966, abandoned.

[30] Foreign Application Priority Data

June 9, 1965 Germany.................................F 46283
June 9, 1965 Germany.................................F 46284

[52] U.S. Cl. ..........................................260/307 D, 424/272
[51] Int. Cl. ......................................................C07d 85/48
[58] Field of Search ...............................................260/307 D

[56] References Cited

UNITED STATES PATENTS 2,877,155    3/1959    Metivier ...................................167/33

Primary Examiner—Alex Mazel
Assistant Examiner—R. V. Rush
Attorney—Curtis, Morris & Safford

[57] ABSTRACT

2-O,O-DIETHYL-DITHIOPHOSPHORYL-METHYL-5,7-DICHLOROBENZOXAZOLE is disclosed as having insecticidal, acaricidal and fungicidal activity.

1 Claim, No Drawings

2-O,O-DITHIOPHOSPHORYL-METHYL-BENZOXAZOLE

This application is a continuation-in-part application of our copending application Ser. No. 552,408 filed May 24, 1966, now abandoned.

The present invention relates to a novel phosphoric acid ester, to its manufacture and use as an agent for combating noxious organisms.

The present invention provides processes for the manufacture of a novel phosphoric acid ester of Formula III by reacting salts of O,O-diethyl-dithiophosphoric acid of Formula I with dichlorobenzoxazoles of Formula II according to the following scheme:

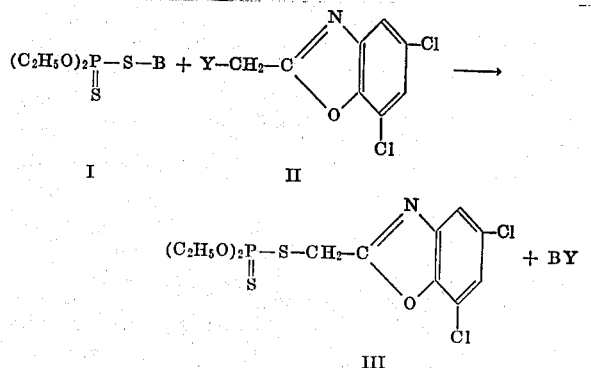

in which B represents an alkali metal, alkaline earth metal or ammonium cation or a cation of an organic base, and Y stands for a halogen atom or a reactive acid radical, for example a sulfonic acid radical.

The novel compound has utility as a pesticide.

2-Halogen-methyl-benzoxazoles of Formula II and sulfonic acid esters of corresponding 2-hydroxymethyl-benzoxazole were unknown up to now. The present invention also relates to these novel compounds which may be prepared as follows:

72 grams of 2-chloroacetamino-4,6-dichlorophenol are heated for 30 minutes with 0.5 gram of zinc chloride in 500 milliliters of o-dichlorobenzene under such conditions that o-dichlorobenzene evaporates slowly and until water does no longer pass with the o-dichlorobenzene. The reaction mixture is cooled to room temperature. The solution is shaken with water and the two layers are separated. The o-dichlorobenzene is removed from the organic solution by distillation under reduced pressure. The residue which solidifies at about 40° C is recrystallized from methanol. 58 grams of 2-chloromethyl-5,7-dichlorobenzoxazole having a melting point of 63° to 64° C are obtained. Using this compound, a pesticidal agent is prepared as indicated in Example 1.

In order to obtain pesticidal compositions, the phosphoric acid ester of Formula III may be mixed with inert solid or liquid carrier materials, with adhesives, wetting agents, and dispersing agents to be used as wettable powders, emulsions, or dusting powders. Such compositions may also be combined with other insecticides, or fungicides. The compositions are used in form of such preparations as to permit a control of the noxious organisms without causing injuries to the host animals, for example in the control of ectoparasites, or to the host plants, for example in the control of phytopathogenic fungi.

As inert carrier materials, there may be used mineral substances for example, aluminium silicates, alumina, kaolin, kieselguhr, or hydrated silicic acids. As inert carrier materials for liquid preparations there may be used all usual and suitable inert organic solvents, for example, toluene, xylene, or other higher boiling aromatic compounds, diacetone alcohol, cyclohexanone, isophorone, gasolines, paraffin oils, dioxane, dimethyl formamide, dimethyl sulphoxide, ethyl acetate, butyl acetate, tetrahydrofurane and chlorobenzene.

As adhesives, there may be used glutinous cellulose products or polyvinyl alcohols.

As wetting agents, there may be used all suitable emulsifiers, for example, hydroxy-ethylated alkylphenols, salts of aryl- or alkyl-aryl sulphonic acids, salts of methyl-taurine, salts of phenylcogasine sulphonic acids or soaps.

As dispersing agents there may be used salts of dried cellulose sulphite liquors, e.g. potassium ligninsulphonate, salts of naphthalene-sulphonic acid and, if required, hydrated silicic acids or even kieselguhr.

Insecticidal compositions obtained according to the invention may preferably be used in the form of an emulsion concentrate containing from 10 to 80 percent by weight of the compound of Formula III and from 5 to 20 percent by weight of a wetting agent, whereas the rest making up 100 percent by weight, is a suitable organic solvent.

When comparing 2-O,O-diethyl-dithiophosphoryl-methyl-5,7-dichlorobenzoxazole with 2-O,O-diethyl-dithiophosphoryl-methylbenzoxazole unsubstituted in the benzene nucleus as known from U.S. Pat. No. 2,877,155, the novel compound is advantageous in having a higher efficacy to pests as well as a lower toxicity for warm blooded animals as shown by the $LD_{50}$ values for rats. These properties enable it to be used for controlling domestic and storage pests as well as other troublesome organisms and ectoparasites.

Moreover, the novel compound shows a good fungicidal effect in addition to the insecticidal and acaricidal effects, especially with mildew.

The following table illustrates the lower toxicity to warm blooded animals of the claimed compound in comparison with the known compound mentioned above.

| Effective ingredient | $LD_{50}$ (rat) |
| --- | --- |
| 2-O,O-diethyl-dithiophosphoryl-methyl-benzoxazole (known compound) | 30 mg/kg rat |
| 2-O,O-diethyl-dithiophosphoryl-methyl-5,7-dichlorobenzoxazole (according to invention) | 105 mg/kg rat |

The following examples serve to illustrate the invention but they are not intended to limit it thereto. The percentages are given by weight.

EXAMPLE 1

45 grams of the potassium salt of O,O-diethyl-dithiophosphoric acid and 48 grams of 2-chloromethyl-5,7-dichlorobenzoxazole having a melting point of 63° to 64° C were refluxed for 15 minutes in 150 milliliters of ethanol. The reaction mixture was cooled to room temperature and the precipitated potassium chloride was filtered off. The ethanol was removed from the filtrate by distillation. 66 grams of 2-O,O-diethyldithiophosphoryl-methyl-5,7-dichlorobenzoxazole were left as a brown oil which after sometime solidified at 23° to 24° C.

| Analysis: | Found | Calculated |
| --- | --- | --- |
| | 7.9% P | 8.2% P |
| | 18.6% Cl | 18.9% Cl |

EXAMPLE 2

A wettable powder is prepared from
- 45 percent of 2-O,O-diethyl-dithiophosphoryl-methyl-5,7-dichlorobenzoxazole
- 42 percent of highly dispersed silicic acid
- 10 percent of calcium salt of ligninsulfonic acid
- 1 percent of sodium salt of oleylmethyltauride
- 2 percent of partially saponified polyvinyl acetate 70/88
  (i.e. degree of polymerization = 70; saponification number = 88)

EXAMPLE 3

An emulsifiable concentrate is prepared from
- 70 percent of 2-O,O-diethyl-dithiophosphoryl-methyl-5,7-dichlorobenzoxazole
- 10 percent of fatty acid polyglycol ester
- 6 percent of calcium salt of phenyl-sulfonic acid
- 14 percent of xylene

EXAMPLE 4

Fattening pigs infested with lice (*Haematopinus suis*) were each sprayed with 0.8 to 1 liter of an aqueous emulsion containing 0.05 to 0.75 percent of active ingredient which was prepared from the following formulation:

- 10 percent of 2-0,0-diethyl-dithiophosphoryl-methyl-5,7-dichlorobenzoxazole
- 78 percent of ethanol
- 10 percent of an alkylphenyl polyglycol ester
- 2 percent of epichlorohydrin.

All lice were killed.

EXAMPLE 5

The following table illustrates some of the advantages of the claimed compound in a formulation analogeous to that of the preceding example over known compounds as regards their effect on larvae of Mexican bean beetles (*Epilachna varivestis*):

| Active ingredient | Concentration, percent | Destruction, percent |
|---|---|---|
| $(C_2H_5O)_2P(S)-S-CH_2-O-$ (5,7-dichlorobenzoxazole) (according to invention) | 0.001 / 0.002 | 90 / 100 |
| $(C_2H_5O)_2P(S)-S-CH_2-C$ (benzoxazole) (known from U.S. Pat. No. 2,877,155) | 0.002 | 40 |
| $(C_2H_5O)_2P(S)-O-C_6H_4-NO_2$ (commercial) | 0.002 | 60 |
| $(C_2H_3O)_2P(S)-S-CH_2-N$ (benzotriazinone) (commercial) | 0.002 | 70 |
| $(C_2H_5O)_2P(S)-O-$ (pyrimidine with CH₃ and CH(CH₃)₂) (commercial) | 0.002 | 20 |

EXAMPLE 6

In order to establish the fungicidal effect of the compounds according to the invention, cultured plants were treated, five days after having been infested with fungi, with an aqueous suspension prepared from a wettable powder of the following composition:

- 10 percent of 2-0,0-diethyl-dithiophosphoryl-methyl-5,7-dichlorobenzoxazole
- 20 percent of amorphous preparation of silicic acid
- 56.5 percent of sodium sulfate
- 10 percent of calcium lignin sulfonate
- 2 percent of alkylphenyl polyglycol ester
- 1.5 percent of stearyl alcohol The following table shows the superiority of the compound according to the invention over the known 2-0,0-diethyl-dithiophosphoryl-methyl-benzoxazole and the commercial 5-amino-1-bis(dimethyl-amidophosphoryl)-3-phenyl-1,2,4-triazole.

TABLE I

| | Concentration of spray liquor containing 10% of active ingredient, percent | Diminution of infestation about 2 weeks after treatment compared with untreated specimen Phaseolis spec., percent | Toxicity to warm blooded animals, LD$_{50}$ in mg./kg. of rat |
|---|---|---|---|
| $(C_2H_5O)_2P(S)-S-CH_2-C$ (5,7-dichlorobenzoxazole) (according to invention) | 0.012 | 100 | 105 |
| $(C_2H_5O)_2P(S)-S-CH_2-C$ (benzoxazole) (known compound) | 0.012 / 0.025 | 50 / 90 | 30 |
| $[(CH_3)_2N]_2P(O)-N-C(NH_2)=N-N=CH-C_6H_5$ (commercial) | 0.025 | 80 | 10–20 |

EXAMPLE 7

2-0,0-diethyl-dithiophosphoryl-methyl-5,7-dichlorobenzoxazole according to the invention was examined for its toxicity to warm-blooded animals in comparison with 2-0,0-diethyl-dithiophosphoryl-methyl-benzoxazole as known from U.S. Pat. No. 2,877,155 Example II, and Claim 3.

The toxicity of said compounds was determined as $LD_{50}$ according to the method of Kärber. This method has repeatedly been described in the pharmacological literature (cp, Leopold Ther "Grundlagen der experimentellen Arzneimittelforschung," Stuttgart 1965, page 77) and has proved useful in practice. It is especially used when the mortality of the group of animals tested varies within certain limits and the morality curve in the coordinate system does not give a clear picture. By the mathematical method developed by Kärber the said variations are limited to a minimum so that the $LD_{50}$ is rather exactly indicated.

The calculation is carried out according to the following general formula $$LD_{50} = Dm - S/m$$

in which $Dm$ is the minimum dose to which all animals react (i.e. by which they are killed), $S$ is the sum total of all (d. z)-values, and $z$ is half the sum of positively reacting (killed) animals of two groups of animals succeeding one another with respect to dose, d is the difference between two successive doses, $m$ is the number of animals per dose or the number of animals in a group per dose.

a. Determination of $LD_{50}$ peroral, using stomach tube: The peroral acute toxicity was tested using 2-0,0-diethyl-dithiophosphoryl-methylm5,7-dichloro-benzoxazole according to the invention and 2-0,0-diethyl-dithiophosphoryl-methyl-benzoxazole. Each of the compounds was applied in the form of emulsifiable solutions of the following composition, the percentages given by weight:

30 percent of active ingredient
50 percent of isophoron
8 percent of xylene
12 percent of emulsifiers consisting of a mixture of calcium salt of tetrapropylene-benzene-sulfonic acid and polyglycol ester of unsaturated fatty acids.

The test animals used were, in all tests, male rats being specifically pathogen-free, strain Wistar, body weight from 100 to 150 grams. The animals were kept over the test period in cages placed in air-conditioned rooms having a temperature of 21° C. The rats were fed on a material manufacture by Messrs. Altromin GmbH. of Lage/Lippe, Germany, which is called "Standard Atromin R," as well as on tap water ad libitum.

First, a preliminary, toxicity test was carried out to determine the approximate limits of the toxicity range. Then, the preparations were administered per os, using a stomach tube, to groups of 10 rats which had been fed, each in a single but increasing dose — calculated on mg of active substance per kg of body weight. The preparations fed were in the form of aqueous emulsions containing 0.25 and 0.1 percent of active ingredient respectively. The observation period after administration was 7 days.

The animals died with convulsive tremors (phosphoric acid ester poisoning) within 45 minutes to 24 hours after administration.

The autopsy of the killed animals did macroscopically not show any striking finding, i.e. death was not caused by any mechanical action.

To a control group of 10 rats carrier material (i.e. preparation without active ingredient) was administered per os, using a stomach tube, at the same dosage as administered with the active preparation to kill all the rats. Over the observation period of 7 days post application, none of these rats showed any clinically detectable difference from normal behavior and all of them survived the test. The results are given in Table II.

TABLE II

Active ingredient according to invention:
2-0,0-diethyl-dithiophosphoryl-methyl-5,7-dichloro-benzoxazole
Determination of $LD_{50}$ peroral, using stomach tube, on male rats being specifically pathogen-free, strain Wistar, body weight from 100 to 150 grams.

| Dose of Active Ingredient in mg/kg Body weight | Number of animals killed/ Number of animals tested | $d \cdot z = s$ |
|---|---|---|
| 200 | 10/10 | 75 · 9.5=712.5 |
| 125 | 9/10 | 45 · 5=225 |
| 80 | 1/10 | 30 · 0.5=15 |
| 50 | 0/10 | $s$=952.5 |
| 32 | 0/10 | (remained unconsidered) |

Hence $LD_{50}$ is 200−(952.5/10)=104.75
Thus, $LD_{50}$ peroral using stomach tube is 105 mg/kg of rat.

Compound known from U.S. Pat. No. 2,877,155:
2-0,0-diethyl-dithiophosphoryl-methyl-benzoxazole.
Determination of $LD_{50}$ peroral as given above.

| Dose of Active Ingredient in mg/kg Body Weight | Number of Animals Killed/ Number of Animals Tested | $d \cdot z = s$ |
|---|---|---|
| 65 | 10/10 | (remained unconsidered) |
| 55 | 10/10 | 10 · 9 = 90 |
| 45 | 8/10 | 5 · 8 = 40 |
| 40 | 8/10 | 5 · 7 = 35 |
| 35 | 6/10 | 5 · 7 = 35 |
| 30 | 8/10 | 5 · 5 = 25 |
| 25 | 2/10 | 10 · 1.5 = 15 |
| 15 | 1/10 | 5 · 1.5 = 7.5 |
| 10 | 2/10 | 5 · 1.0 = 5 |
| 5 | 0/10 | |
| | | $s$= 252.5 |

Hence $LD_{50} = 55 - (252.5/10) = 29.75$
Thus, $LD_{50}$ peroral, using a stomach tube, is 30 mg/kg of rat.

b. Determination of dermal $LD_{50}$:
The material used was as given sub (a).

First, a preliminary toxicity test was carried out to determine the approximate limits of the toxicity range. Then, the preparations were applied by means of a brush to the shaven back skin of groups of 10 rats that had been fed normally. Each preparation was applied at an single but increasing dosage, calculated on mg of active ingredient per kg of body weight. For this purpose, the rats were stretched in a vice and closely shaved from neck to tail over an area of from 1 to 1.5 cm right and left their spines by means of a specific shaving machine. The preparations were applied dermally to the whole area shaven in the form of aqueous emulsions containing 0.25 and 0.1 percent of active ingredient (without loss of preparation). Until the skin had completely dried the rats remained separately fixed for about 3 hours in order to prevent the preparation to be stripped or licked off the skin. Subsequently, each animal was separately placed in a cage. The observation period after application was 7 days.

The animals died with convulsive tremors (phosphoric acid ester poisoning) within 4 to 48 hours after application. The autopsy of the killed animals did macroscopically not show any striking finding.

To a control group of 10 rats carrier material (i.e. preparation without active ingredient) was applied in the same manner as described above at the same dosage as applied with active ingredient to kill all the rats. Over the observation period of 7 days post application, none of the rats showed any clinically detectable difference from normal behavior and all of them survived the test. The results are given in Table III.

TABLE III

Active ingredients according to invention:
2-0,0-diethyl-dithiophosphoryl-methyl-5,7-dichlorobenzoxazole Determination of $LD_{50}$ dermal on male rats being specifically pathogen-free, strain Wistar, body weight from 100 to 150 grams.

| Dose of Active Ingredient in mg/kg Body Weight | Number of Animals Killed/ Number of Animals Tested | $d \cdot z = s$ |
|---|---|---|
| 2000 | 10/10 | (remained unconsidered) |
| 1750 | 10/10 | 250 · 7 = 1750 |
| 1500 | 4/10 | 250 · 4.5 = 1125 |
| 1250 | 5/10 | 250 · 5 = 1250 |
| 1000 | 5/10 | 250 · 4 = 1000 |
| 750 | 3/10 | 250 · 2.5 = 625 |
| 500 | 2/10 | 150 · 2 = 300 |
| 350 | 2/10 | 150 · 2 = 300 |
| 200 | 2/10 | 100 · 1 = 100 |
| 100 | 0/10 | |
| | | $s = 6450$ |

Hence $LD_{50}$ is $1750 - (6450/10) = 1105$
Thus, $LD_{50}$ dermal is 1105 mg/kg of rat.

Compound known from U.S. Pat. No. 2,877,155:
2-0,0-diethyl-dithiophosphoryl-methyl-benzoxazole.
Determination of $LD_{50}$ dermal as given above.

| Dose of Active Ingredient in mg/kg Body Weight | Number of Animals Killed/ Number of Animals Tested | $d \cdot z = s$ |
|---|---|---|
| 1000 | 10/10 | (remained unconsidered) |
| 500 | 10/10 | (remained unconsidered) |
| 250 | 10/10 | (remained unconsidered) |
| 200 | 10/10 | 50 · 9.5 = 475 |
| 150 | 9/10 | 25 · 9 = 225 |
| 125 | 9/10 | 25 · 8.5 = 212.5 |
| 100 | 8/10 | 25 · 7 = 175 |
| 75 | 6/10 | 25 · 5.5 = 137.5 |
| 50 | 5/10 | 25 · 2.5 = 62.5 |
| 25 | 0/10 | |
| | | $s = 1287.5$ |

Hence $LD_{50}$ is $200 - (1287.5/10) = 71.25$
Thus, the dermal $LD_{50}$ is 71 mg/kg of rat.

EXAMPLE 8

2-0,0-diethyl-dithiophosphoryl-methyl-5,7-dichlorobenzoxazole was tested and compared under the same test conditions with 2-0,0-diethyl-dithiophosphorylmethylbenzoxazole not substituted by chlorine as known from U.S. Pat. No. 2,877,155 to determine their insecticidal and acaricidal effects. The test arrangement chosen was partially so that the effect of the individual compositions could be compared over short and prolonged periods of time.

For carrying out the following Tests 1 and 2, compositions in the form of emulsifiable solutions containing the following components were prepared, the percentages being by weight:
10 per cent active ingredient
78 per cent absolute ethyl alcohol
2 per cent epichlorohydrin
10 per cent oethylated alkyl phenol
with 10 mols of ethylene oxide For Test 3, the phosphoric acid esters mentioned were dissolved in acetone in a manner disclosed hereinafter.

TEST 1

Guinea pigs having a body weight of from 600 to 700 grams were bathed for half a minute in luke-warm emulsions each containing one of the active ingredients. The emulsions had been prepared using the above-mentioned emulsifiable 10 percent solutions of these active ingredients. These solutions had been processed with water into emulsions each containing an active ingredient in a concentration of 0.1 or 0.05 percent. One guinea pig was used per composition and concentration. One guinea pig that had been bathed in pure water served as a control. After bathing, the guinea pigs were kept separately in wire-meshed cages at a temperature of 20°–22° C. After the furs had dried (day zero) as well as after 1, 4, 6, 10, 13, 15, 18 and 25 days, parts of the guinea pigs's furs were cut, about 1 gram of hair per guinea pig. The hair of each guinea pig was equally spread on a petri dish and then 10 ticks (*Ornithodorus moubata*, fifth nymphal stage) were placed on each dish. The dishes were subsequently stored in an incubator at a temperature of 36° C. At intervals each of 3 days the mortality of the ticks was determined. After 25 days a pronounced decrease in activity could be established; for this reason the time for which the ticks stayed in the hair was prolonged from 3 to 5 days in order to obtain significant results.

The test results in Table IV show that the effect of the known substance in the hair of the test animals is still the same after 4 days as that of the substance of the invention: all ticks are killed within 3 days. After a stay of 6 days and more in the incubator at 36° C, the effect of the known substance in the hair of the test animals is strongly reduced, whereas the compound of the invention preserves its full activity for 12 more days.

TEST 2

Ticks (*Ornithodorus moubata*) of the third nymphal stage were spray-treated in petri dishes with emulsions that had been prepared from the above-mentioned emulsifiable 10 percent solutions by dilution with water. The content of active ingredient amounted to 0.05, 0.025, 0.012 and 0.006 per cent respectively. For each spray-treatment 2 milliliters of emulsion were used which corresponded to an amount of active ingredient of 0.4 mg. 0.2 mg. 0.096 mg and 0.048 mg each per 100 cm² of the spray treated substrate.

10 ticks were used for each composition and concentration. After the treatment the ticks were transferred to untreated petri dishes which were placed on a heating plate at 35° C. The morality of the ticks was determined on the first, second and third day after treatment.

The test results indicated in Table V distinctly demonstrate that 2-0,0-diethyl-dithiophosphoryl-methyl-5,7-dichlorobenzoxazole of the invention has a substantial better and quicker effect on ticks than the known benzoxazole phosphoric acid ester not substituted by chlorine.

A repetition of this test carried out with two differently developed stages of ticks (*Ornithodorus moubata*, third and fifth nymphal stages) and partially modified concentrations of active ingredient confirmed the results obtained in the first test as indicated in Table VI.

TEST 3

Solutions of 2-0,0-diethyl-dithiophosphoryl-methyl-5,7-dichlorobenzoxazole according to the invention and of 2-0,0-diethyl-dithiophosphoryl-methyl-benzoxazole as known from U.S. Pat. No. 2,877,155 respectively in acetone were prepared in concentrations of 0.025 and 0.012 percent of each compound. One milliliter each of these solutions was applied to the petri dishes having a diameter of 9 cm, and evenly distributed by waiving the dishes. After evaporation of the solvent, the petri dishes being covered each with 0.373 mg of the active ingredient concerned per 100 cm², or with 0.186 mg of the active ingredient concerned per 100 cm² of area, were stored unprotected at +50° C in an incubator. At intervals of 1, 2, 3 and 4 days, 10 house flies (Musca domestica) were placed on each petri dish containing each active ingredient in both concentrations, and upon placing them in the laboratory at +22°C the effect of the residues was determined after 3 hours.

For comparison's sake flies were placed immediately after evaporation of the solvent on petri dishes that had not been stored previously in the incubator. Untreated petri dishes served for a control.

The results of this test as indicated in Table VII show that the petri dishes treated with the phosphoric acid ester of 5,7-dichlorosubstituted benzoxazole exhibit a better insecticidal effect than petri dishes that has been treated with the known compound that had not been substituted by chlorine. Hence, the conclusion can be drawn that the compound substituted by chlorine in 5,7-position according to the invention is effective against insects for a substantially longer time than the known compound that is not substituted by chlorine.

TABLE IV

| | Concentration of active ingredients in emulsion in percent | Mortality of ticks in percent after contacting hair which was cut- -days after bathing guinea pigs | | | | | | | | |
|---|---|---|---|---|---|---|---|---|---|---|
| | | 0 day | 1 day | 4 days | 6 days | 11 days | 13 days | 15 days | 18 days | 25 days |
| Emulsion containing: | | | | | | | | | | |
| 5,7-dichloro compound according to invention | 0.1 | 100 | 100 | 100 | 100 | 100 | 100 | 100 | 100 | 100 |
| | 0.05 | 100 | 100 | 100 | 100 | 100 | 100 | 100 | 100 | 100 |
| Unsubstituted compound known from U.S. Patent 2,877,155 | 0.1 | 100 | 100 | 100 | 100 | 100 | 100 | 100 | 80 | 20 |
| | 0.05 | 100 | 100 | 100 | 80 | 80 | 80 | 50 | 40 | 0 |
| Control | 0 | 0 | 0 | 0 | 0 | 0 | 0 | 0 | 0 | 0 |

Note.—Effects of active ingredients in hair of guinea pigs on ticks (Ornithodorus moubata), 10 ticks per dosage.

TABLE V

| | Concentration of active ingredient | | Mortality of ticks in percent—days after treatment | | |
|---|---|---|---|---|---|
| | Percent in emulsion | Milligram per 100 cm.² | 1 day | 2 days | 3 days |
| Emulsion containing: | | | | | |
| 5,7-dichloro compound according to invention | 0.05 | 0.4 | 100 | | |
| | 0.025 | 0.2 | 90 | 100 | |
| | 0.012 | 0.096 | 30 | 70 | 100 |
| | 0.006 | 0.048 | 0 | 40 | 50 |
| Unsubstituted compound known from U.S. Pat. 2,877,155 | 0.05 | 0.4 | 10 | 30 | 100 |
| | 0.025 | 0.2 | 0 | 20 | 40 |
| | 0.012 | 0.096 | 0 | 0 | 20 |
| | 0.006 | 0.048 | 0 | 0 | 0 |
| Control | 0 | 0 | 0 | 0 | 0 |

Note.—Treatment of ticks (Ornithodorus moubata), 10 ticks per dosage 3d nymphale stage.

TABLE VI

| | Concentration of active ingredient | | Mortality of ticks in percent | | | | | |
|---|---|---|---|---|---|---|---|---|
| | Percent in emulsion | Milligram per 100 cm.² | 3d nymphal stage—days after treatment | | | 5th nymphal stage—days after treatment | | |
| | | | 1 day | 2 days | 3 days | 1 day | 2 days | 3 days |
| Emulsion containing: | | | | | | | | |
| 5,7-dichloro compound according to invention | 0.05 | 0.4 | 90 | 100 | | 40 | 100 | |
| | 0.025 | 0.2 | 70 | 100 | | 0 | 80 | 80 |
| | 0.006 | 0.048 | 40 | 60 | 80 | 0 | 0 | 70 |
| | 0.003 | 0.024 | 0 | 0 | 20 | 0 | 0 | 20 |
| Unsubstituted compound known from U.S. Pat. 2,877,155 | 0.05 | 0.4 | 30 | 80 | 80 | 0 | 60 | 60 |
| | 0.025 | 0.2 | 30 | 60 | 60 | 0 | 50 | 50 |
| | 0.006 | 0.048 | 0 | 10 | 10 | 0 | 0 | 20 |
| | 0.003 | 0.024 | 0 | 0 | 0 | 0 | 0 | 0 |
| Control | 0 | 0 | 0 | 0 | 0 | 0 | 0 | 0 |

Note.—Treatment of ticks (Ornithodorus moubata), 10 ticks per dosage. Repetition 3d nymphal stage and 5th nymphal stage.

TABLE VII

| | Concentration of active compound | | Mortality of flies in percent after 3 hours' stay in Petri dishes stored before at— | | | | | |
|---|---|---|---|---|---|---|---|---|
| | Percent in acetone | Milligram per 100 cm.² | 22°C. | | 50°C. | | | |
| Active compound | | | 0 day | 1 day | 2 days | 3 days | 4 days | |
| 5,7-dichloro compound according to invention | 0.025 | 0.373 | 100 | 100 | 100 | 90 | 100 | |
| | 0.012 | 0.186 | 100 | 50 | 40 | 70 | 30 | |
| Unsubstituted compound known from U.S. Pat. 2,877,155 | 0.025 | 0.373 | 100 | 50 | 10 | 10 | 0 | |
| | 0.012 | 0.186 | 100 | 10 | 0 | 0 | 0 | |
| Control | 0 | 0 | 0 | 0 | 0 | 0 | 0 | |

Note.—Effects of residues of active compounds on house flies (Musca domestica) after storage in Petri dishes at 50° C.; 10 flies per dosage.

We claim:
1. 2-0,0-Diethyl-dithiophosphoryl-methyl-5,7-dichlorobenzoxazole.

* * * * *